May 20, 1958 R. G. STEPHENS 2,835,445

REVERSIBLE COUNTERS

Filed July 22, 1954 3 Sheets-Sheet 1

Richard G. Stephens

INVENTOR

Richard G. Stephens
INVENTOR

Richard G. Stephens
INVENTOR

United States Patent Office 2,835,445

Patented May 20, 1958

2,835,445

REVERSIBLE COUNTERS

Richard G. Stephens, Binghamton, N. Y., assignor to Link Aviation, Inc., Binghamton, N. Y., a corporation of New York Application July 22, 1954, Serial No. 444,987

14 Claims. (Cl. 235—92)

My invention relates to reversible digital counting circuits and is in some respects an improvement over the invention disclosed in application Ser. No. 425,462, entitled "Reversible Counter," by Monson H. Hayes and James L. West, filed April 26, 1954, and assigned to the same assignee as the present invention. In many digital computers, automatic control and instrumentation problems devices are necessary which will count large numbers of pulses at extremely rapid rates, and often it is further necessary that such devices be reversible and operate without backlash. Furthermore, it is often desirable that such counting devices be direct-coupled. As is well-known in the electronic arts, direct-coupled circuits are less susceptible to "noise," and are more reliable because capacitors, which frequently fail and must be replaced, are eliminated from the signal circuits.

It is therefore an object of the invention to provide improved direct-coupled reversible counting circuits.

It is another object of the invention to provide improved reversible counting circuits which may be connected to identical higher order counting circuits to provide counters capable of registering extremely large numbers.

It is another object of the invention to provide improved reversible counters utilizing a high speed multi-electrode gaseous discharge tube.

It is yet a further object of the invention to provide an improved reversible counter which may be used to count voltage pulses of any set of three-phase voltages, in which counting direction is dependent upon phase sequence of said voltages.

It is still another object of the invention to provide new and improved counting circuits, which may be readily utilized in constructing counters which will count with a base member of "three" or above.

Other objects of the invention will in part be obvious and will in part appear hereinafter.

The invention accordingly comprises the features of construction, combinations of elements, and arrangements of parts, which will be exemplified in the constructions hereinafter set forth, and the scope of the invention will be indicated in the claims.

For a better understanding of my invention, reference may be had to the accompanying drawings, in which.

Figure 4:
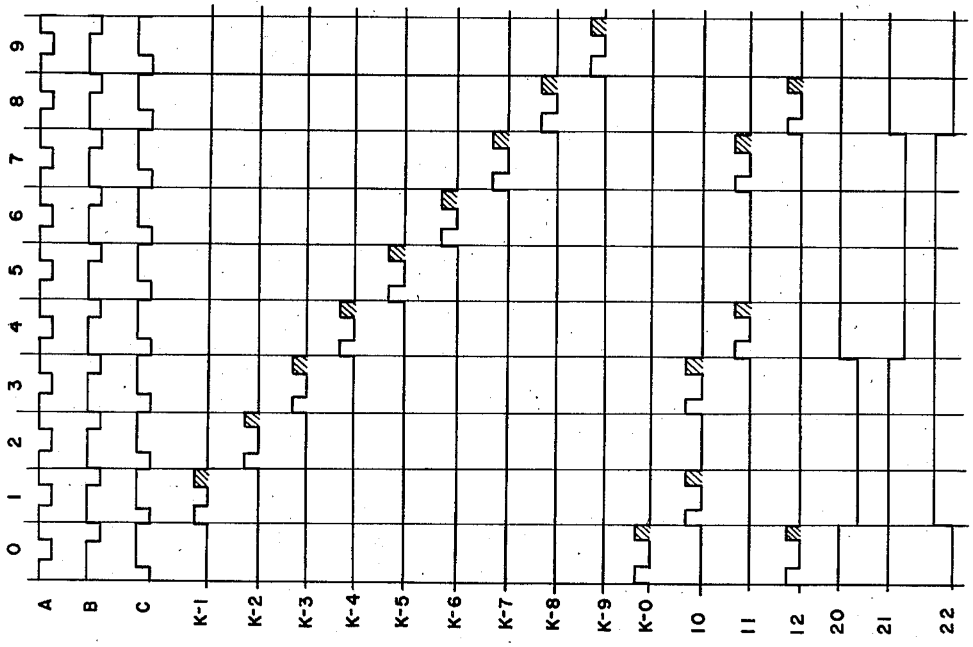
Figure 7:
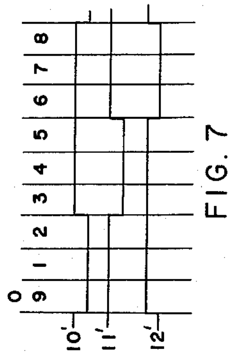
Figure 2:
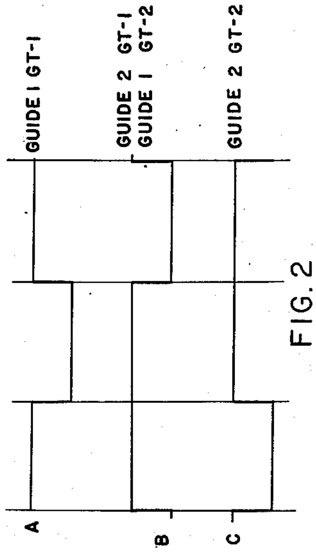
Fig. 2 is a diagram showing graphically the potentials applied to certain elements of the device of Fig. 1 during a unit counting cycle.
Figure 3:
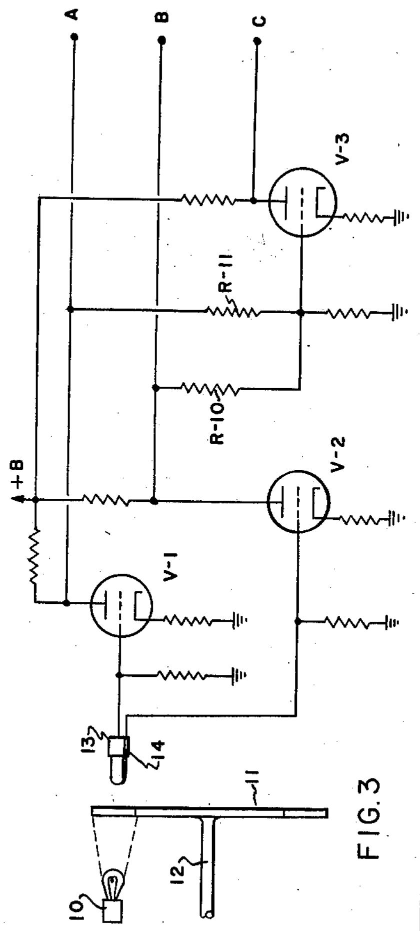
Fig. 3 is a schematic diagram showing a typical sensing device which may be used in conjunction with the invention for counting, or "digitizing" shaft rotation.
Figure 6:
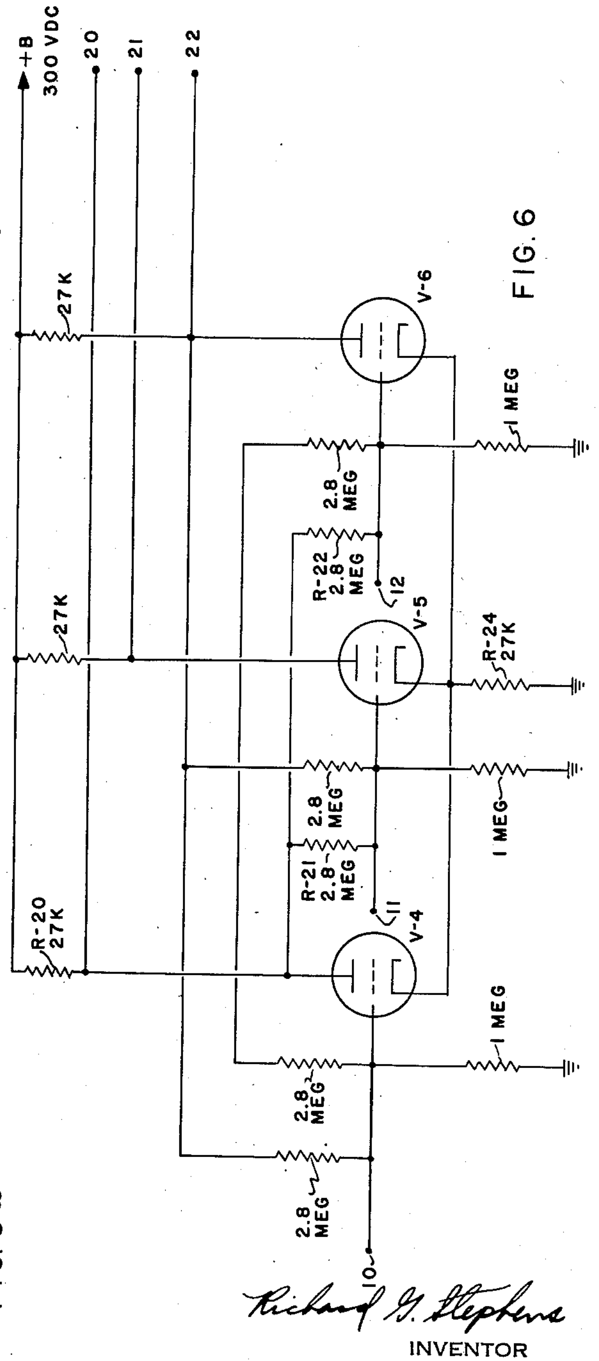
Figure 3A:
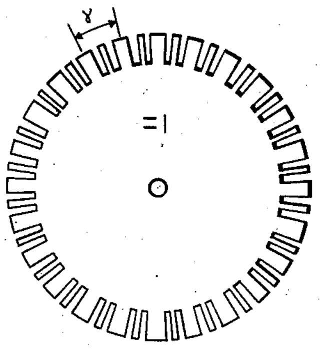
Figure 5:
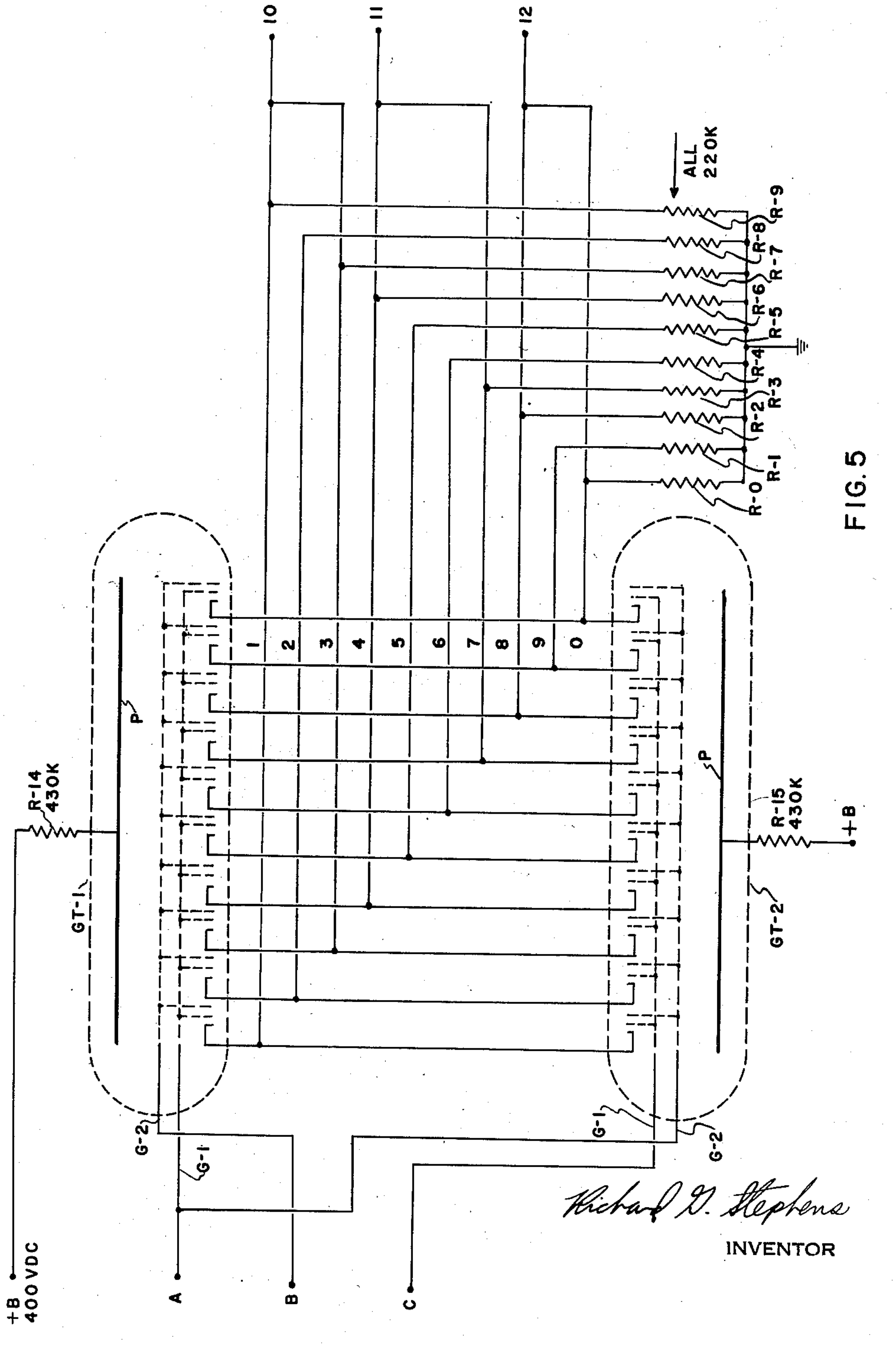

Fig. 3*a* is a plan view of a slotted disk utilized in Fig. 3;

Fig. 4 is a diagram showing graphically the potentials appearing at various portions of a counting circuit constructed according to the invention for ten complete counting cycles;

Fig. 5 is an electrical schematic diagram showing a portion of a typical counting stage constructed in accordance with my invention;

Fig. 6 is an electrical schematic diagram of a tri-stable flip-flop which may be used in practicing the invention; and Fig. 7 is a diagram of certain potentials in an alternative embodiment of the invention constructed to count according to a base number of "nine." It will be appreciated that the graphic diagrams of Figures 2, 4 and 7 are not plotted to any particular scale, and only "high" or "low" voltage states are shown.

The present invention may utilize as its basic counting element an Ericsson valve GS–10C, which is described in an article "The Dekatron" by Bacon and Pollard in Electronic Engineering, vol. 22, of May 1950. Since the detailed structure and theory of operation of this tube per se is set forth in detail in the above article, only a brief description of this tube will be given herein. It will become apparent, however, as the description proceeds, that the present invention is not limited precisely to that particular tube, and that similar tubes may be utilized in practicing the invention.

Figure 1:
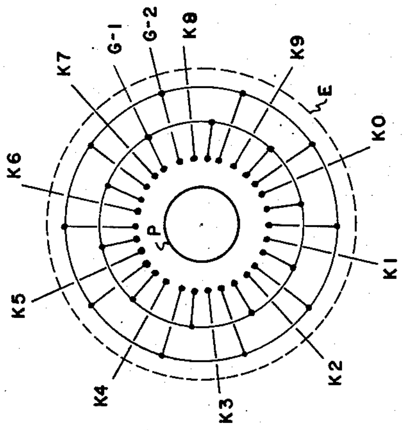
Fig. 1 is an electrical schematic diagram of the glow transfer tube utilized as a basic counting element in a preferred embodiment of the invention.

Fig. 1 shows schematically a cold cathode gaseous discharge valve designated therein as GT–1 having a total of 31 elements. Thirty of the elements comprise a plurality of similar vertical equi-spaced rods or wires arranged in circular array about a disc shaped element P, which may, for convenience, be designated the "anode." Ten of the 30 rod-like elements are referred to for convenience as "cathodes," though it is to be understood that such cathodes need have no property of thermionic electron emission. The ten cathodes are identified in Fig. 1 by the symbols K–0 to K–9. Situated between each pair of cathodes are two similar rod-like elements which may be referred to for convenience as "guides." Those guides located immediately clockwise from their respective cathodes are all interconnected and may be referred to collectively as "guide set one," and an external terminal G–1 as provided for electrical connections to guide set one. Those guides disposed immediately clockwise from the G–1 guides are all interconnected and may be referred to collectively as "guide set two," to which is connected an external terminal G–2. All of the elements are situated within a gas-filled envelope E, and connections extend from within said envelope to connect to the individual cathodes, the anode, and the guide sets.

If a voltage in excess of the ionization potential of the gas is applied to anode P and a given cathode, a gaseous glow discharge will become established therebetween. Assume that anode P in Fig. 1 is connected to a source of positive direct voltage and the voltage sufficiently negative with respect thereto is applied to cathode K–1, so that a glow discharge exists between anode P and cathode K–1. Now, if a more negative voltage than that on cathode K–1 is applied to G–1, the terminal of guide set one, the glow will transfer so as to become established from anode P to the adjacent clockwise guide of guide set one, and will no longer exist between cathode K–1 and anode P. Resistances may be inserted in the external circuit of each element and the anode element, so that anode current is limited at any instant of time to between the anode and only one other element. If next, the potential of guide set two is made more negative than that of guide set one, the glow will be further translated clockwise to exist between anode P and the guide electrode 2 adjacent cathode K–2. Finally, if the voltage of cathode K–2 is then made more negative than that of guide set two, the glow will transfer to cathode K–2. In this manner, a translation from one cathode to an adjacent cathode, or a "count of one" has been made.

By arbitrarily numbering the cathode successively from zero to nine in a given direction, the count will progress in an additive manner if the glow is transferred in that direction. By sampling the cathode potentials it is possible to sense electrically the position of the glow discharge. By viewing the top or face of the tube, one may view the position of the glow discharge, and by placing numerals on or adjacent the tube, an easily readable visual indication of the count may also be provided.

If, in the single counting cycle described above, the order of lowering (making more negative) of the guide set potentials were reversed, so that guide set two potentials were lowered before guide set one potentials, the discharge would have been transferred in an opposite, or counter-clockwise direction, going from cathode 1 to guide set two situated immediately counter-clockwise from cathode K–1, and then progressing through the remainder of a similar but reversed counting cycle to be transferred ultimately to cathode K–0.

It may be noted that a single complete counting cycle (translation of the current from a given cathode to an adjacent cathode) is comprised of three distinct states. Since the voltages applied to lower and raise the potentials of the guide sets vary the direction of counting according to their order of application, and since they are applied in three different stages per unit count, it may be seen that reversing the count (addition to subtraction, or vice versa) may be done at any third of the counting cycle. Since the highest or fastest possible counting cycle is determined by the minimum time required to complete the transfer of the glow discharge from one electrode to an adjacent electrode, it will become apparent that maximum counting speed may be provided by providing a counter which requires as few as possible transfers of the glow discharge per "unit" count, or transfer from one cathode to an adjacent cathode. This is an important distinction between the present invention and the invention shown in the above-mentioned Hayes and West application. Since the present invention requires only three states per counting cycle, and the Hayes and West invention requires four states per counting cycle, a four-thirds improvement in counting speed is obtained by the present invention.

In practicing the invention, potentials such as those shown as A and B in Fig. 2 are applied to the two guide sets during one complete clockwise counting cycle. During the first ⅓ of a counting cycle, the potentials of both guide sets are higher than the potential of all cathodes, so that any glow established within the tube will be established between the anode and a cathode. During the second third of a counting cycle, it will be seen that voltage A to terminal G–1 is lowered, and that during the last or third third of a counting cycle, the voltage B applied to guide set two is lowered. While Fig. 2 is not plotted to any particular scale, it will be realized that the voltages shown as high are voltages higher than adjacent cathode potentials, and that voltages shown as low are lower than adjacent cathode potentials. In practising the invention, constant voltage is applied to the anode and cathodes, and the guide set voltages are lowered and raised below and above the cathode potentials. It may be seen that the two voltages of Fig. 2 are each non-symmetrical, and that the voltage applied to G–1 leads the voltage applied to G–2 by 120 degrees. If the potentials were oppositely applied, with the potential to G–2 leading, the counting would progress in a counter-clockwise manner. It will be apparent to those skilled in the art that pairs of such voltages phased 120 degrees apart in accordance with direction are commonly produced as outputs from numerous electrical and electronic devices. For example, such voltages may be provided from the circuit of Fig. 3, a shaft rotation digitizer.

Shown in Fig. 3 is a light source 10 which directs light toward a slotted rotating disc 11, which is affixed to rotate with shaft 12, the rotation of which is to be measured. Disc 11, which is shown in greater detail in Fig. 3*a* comprises an opaque disc having a plurality of slots arranged around its periphery in the manner shown in Fig. 3*a*. As disc 11 rotates the light from light source 10 will periodically pass through the slots of disc 11 to impinge upon photo cells 13 and 14. Each pair of slots in disc 11 are separated by an unslotted or opaque portion, and it may be seen that the order in which photo multiplier tubes 13 and 14 are energized depends upon the direction of rotation of disc 11. The angular distance $\alpha$ shown in Fig. 3*a* represents one cycle of the periodic light pattern striking photo cells 13 and 14, and if the photo-cells are arranged $\alpha/3$ distance apart, they will produce electrical signals displaced in phase 120 electrical degrees. The output currents from photo multiplier tubes 13 and 14 are applied to the grids of triodes V–1 and V–2, which amplify the outputs and apply them to terminals A and B. Numerous other sensing devices may be utilized to provide two such voltages, which are phased 120 degrees apart according to direction of motion. Any two voltages of a three-phase system may be utilized.

As voltages such as those shown graphically as A and B in Fig. 2 are applied to the guide sets, the count will progress continuously around the tube by repetition of the counting cycle. Since the electrodes are spaced symmetrically and equi-distantly in circular array about the anode, their numerical designation may be entirely arbitrary. Therefore, no special re-setting provision need be made for translating from K–9 to K–0, or from K–0 to K–9, such as would be necessary in prior art counting tubes in which the elements are arranged in straight line fashion. In most counting or translating problems it is neecssary that counts be made of many more than ten pulses, and while some additional cathodes and guides within the gas tube could be provided, it becomes desirable to provide succeeding higher order stages or decades, so that counts of tens, hundreds, thousands, ten-thousands, etc., may be made. It will be apparent, however, that an output signal derived by sampling the cathode potential of one of the cathodes of the tube of Fig. 1 is not suitable for operating a succeeding similar decade counter. In order that a similar decade counter may be operated by the output of the first counting stage, two voltages out-of-phase according to counting direction, and having a rate of repetition one-tenth of that of the original input voltages should be provided. In addition, the count must be able to proceed from a higher order decade to a lower order decade, as well as in the reverse direction.

Referring to Fig. 4 there are shown graphically plotted versus time the guide set and cathode potentials of the tube GT–1 with respect to ground for ten complete clockwise counting cycles. Assume that tube GT–1 is a GS–10C or "dekatron" tube used in the lowest order or units portion of a counter. Line A represents a potential on guide set 1 of GT–1 and line B represents the potential on guide set 2 of GT–1. As may be seen from Fig. 4, there exists a glow discharge between anode P and one element during each one-third of a counting cycle from 9 to 0. During the first third cycle of a transfer from K–9 to K–0, or during the last third cycle of a transfer from K–0 to K–9, no discharge exists to either of the guides of GT–1. Between these two periods, a discharge exists to one or the other of the two guides situated between the K–9 and the K–0 cathodes, but not to either of the cathodes. This means that during those particular third cycles, a succeeding higher order decade attached to the K–9 and K–10 cathodes of tube GT–1 to be operated upon a count of 10 will not have an electrical signal to indicate the direction of counting. Hence a reversal of counting during those two middle third-cycles of a transfer from 9 to 0 or from 0 to 9 would have electrical back-lash, so that a miscount might be obtained if the counter indication were to be read during the particular third cycle. The invention eliminates such back-lash by provision of a second glow transfer tube GT–2, which counts in similar manner to GT–1, but which is connected so as to lag or lead two-thirds of a counting cycle behind or ahead of the first counting tube GT–1. The number of the "count," however, will always be indicated by GT–1.

It may be seen that since the manner of application of guide set voltages determines the glow transfer, that GT–2 may be caused to be two-thirds of a cycle behind or ahead of GT–1 by applying guide set voltages to GT–2 which lag or lead GT–1 guide set voltages by this amount.

If voltage A of Fig. 4 is applied to guide set one of GT–1, and voltage B is applied to guide set two of GT–1, and if voltage C is applied to guide set one of GT–2, and voltage A is applied to guide set two of GT–2, GT–2 may be seen to be two thirds of a counting cycle behind GT–1. Voltage C may be derived by the provision of an additional tube V–3 of Fig. 3, or may be provided by means of a further photo multiplier tube arranged 120 electrical degrees out-of-phase from photo multiplier tubes 13 and 14. As shown in Fig. 3 the grid of triode V–3 is connected through resistors R–10 and R–11 to the plates of triodes V–1 and V2. Hence it may be seen that whenever the plate voltages of both triodes V–1 and V–2 are high (during the first third of the counting cycle shown in Fig. 2) a high positive voltage will be applied to the grid of V–3, causing the anode potential C of V–3 to be low. The circuit constants of triode V–3 are arranged in conventional manner so that whenever either voltage A or voltage B is low, the grid voltage of triode V–3 will be low (at or near cut-off) so that voltage C will be high. Thus voltages A, B and C as shown in Fig. 2 are derived.

In Fig. 4 lines K–0 to K–9 illustrate cathode potentials during ten complete clockwise counting cycles. The shaded pulses indicate rises in cathode potentials due to current flow to GT–2 cathodes, and the unshaded pulses indicate rises in cathode potentials due to current flow to GT–1 cathodes for clockwise additive counting. It may be noted, and will have been made apparent from the above discussion, that cathode current flows to raise the cathode potential in each tube during each first third cycle, when neither guide set is at a lowered potential.

Referring to Fig. 5 there is shown a circuit by means of which the input pulses A, B and C are applied to a pair of multi-electrode gaseous discharge tubes to be counted and to provide suitable voltages for operating a tri-stable flip-flop to provide suitable voltages for operating a similar higher order decade without electrical backlash. All corresponding cathodes of GT–1 and GT–2 are connected together and through common cathode resistors (R–0 to R–9) to ground potential as shown. High positive voltages from a power supply +B are applied through resistors R–14 and R–15 to anodes P of multi-electrode gaseous discharge tubes GT–1 and GT–2, respectively. As voltages A, B and C are applied to the guide sets of the gas tube pair, the glow discharge current will transfer from cathode to cathode in the manner described above. When the glow discharge exists to any particular cathode, the cathode potential will become more positive due to the voltage drop in its respective cathode resistor, and hence pulses such as those shown in lines K–0 to K–9 of Fig. 4 will occur as the glow tubes translate in clockwise manner. Since like-numbered cathodes of the two tubes are interconnected, and since the two tubes are two-thirds of a count displaced, it will be seen that the common terminal of each pair of interconnected cathodes will receive two positive pulses displaced in time two thirds of a single counting cycle. If the tubes are counting clockwise additively, the pulses will occur as in Fig. 4, with the first pulse (unshaded) on each common cathode terminal occurring because of cathode current in GT–1 and with the second pulse (shaded) occurring because of cathode current in GT–2.

In Fig. 5 certain of the cathode pair common terminals are interconnected to provide output terminals 10, 11 and 12. It may be seen that the K–1 and K–3 cathode terminals are interconnected to provide terminal 10; the K–4 and K–7 terminals are interconnected to provide terminal 11; and the K–8 and K–0 terminals are interconnected to provide terminal 12. The counting stage output terminals 10, 11 and 12 will thereby have voltages such as those shown graphically in Fig. 4. These voltages are applied as shown in Fig. 6 to the input terminals of a tri-stable flip-flop. The function of the flip-flop is to receive an input pulse on one of three different input terminals, and to provide a high voltage on two output terminals and a low voltage on a third output terminal related to the pulse-actuated input terminal. While a particular form of tri-stable flip-flop is illustrated, it should be understood that various other known tri-stable flip-flops may be used in practicing the invention. In Fig. 6, triodes V–4, V–5 and V–6 are connected so that if a positive input pulse is applied to the grid of a particular triode, that tube will become saturated and the other two tubes will cut off. Assume that a positive input pulse of sufficient magnitude is applied at terminal 10 so as to drive tube V–4 to saturation. The plate voltage of V–4 will drop due to the voltage drop in resistor R–20. The decrease in plate voltage of tube V–4 is direct-coupled through resistors R–21 and R–22 to the grids of tubes V–5 and V–6, lowering these latter grid voltages and driving tubes V–5 and V–6 to cutoff, thereby raising their plate voltages. Since all three triodes are connected through a common cathode resistor R–24, fast transition is obtained as in ordinary bi-stable flip-flops. Now, if further positive pulses are applied to terminal 10, tube V–4 will be unaffected, and will remain saturated. However, as soon as a positive input pulse of sufficient magnitude is applied to terminal 11 or 12, either V–5 or V–6 will become saturated, and the other two tubes will become cut off. The output terminals 20, 21 and 22 from the flip-flop are connected to the plates of the triodes. Referring again to Fig. 4, it may be seen that as the voltages of terminals 10, 11 and 12 are applied to the input circuits of the flip-flop, that the voltages shown plotted against time at 20, 21 and 22 will appear at the output terminals of the flip-flop. Inspection of the voltages 20, 21 and 22 will show that each voltage is low for a period when the other two voltages are high, and that each voltage changes state at one-tenth the rate of the original input voltages A and B. Hence the voltages at terminals 20, 21 and 22 may be seen to be suitable for operating the guide sets of an identical, higher order glow tube decade. The cathode voltages of the second decade pair may be used to actuate an identical flip-flop to provide suitable voltages for operating the guide sets of a third decade glow tube pair, etc., and in this manner as many succeeding higher order decades as desired may be attached.

It may be noted that the voltage at terminal 21 exists at a low value for a longer period than the voltages at terminals 20 and 22, and that, therefore, the three voltages may not be said to be precisely 120 degrees out-of-phase. In order to correctly drive the guide sets of a glow tube pair according to the invention, it is necessary only that a trio of voltages be provided in tri-stable fashion, so that one voltage is low while the other two voltages are high. It is desirable to make the low state time durations of the three voltages as equal as possible, however, since the maximum permissible "noise" allowable without causing a miscount will depend upon the time duration of the low state of the voltage having the shortest low state time duration. It is possible to make the low states of the three voltages of exactly equal time duration in second or higher order counting stages only in counters utilizing base numbers which are multiples of the number "three."

If glow tubes are provided with suitable numbers of elements, counting may be done with base numbers other than "ten." For example, if the glow tubes utilized each have nine cathodes and eighteen guides, counting may be done according to a base number of "nine," and because "nine" is an integral multiple of "three," the guide set voltages in all stages may have low states of equal time duration. In a counter utilizing the base number "nine," the K–0 and K–2 cathodes could be interconnected, the K–3 and K–5 cathodes interconnected, and the K–6 and K–8 cathodes interconnected, to provide suitable voltages for driving a tri-stable flip-flop. Voltages such as those shown at 10′, 11′ and 12′ in Fig. 7 would then be provided, and it may be seen that each of the voltages shown has a low voltage state of the same time duration. It will be apparent that other cathode pair interconnections may be made to give equivalent operation. In selecting cathode pairs to be interconnected, it is necessary only that the base number of cathodes of a particular stage be divided into three groups, in which each group consists of a number of adjacent cathodes, and that the first and last cathode of each group be interconnected to form an output terminal to drive a succeeding tri-stable flip-flop.

Another advantage of the present invention over the aforementioned Hayes and West invention is that the present invention may be utilized for counting according to a base number of three. If glow tubes having three cathodes and six guides are provided, with the K–1, K–3 and K–2 terminals connected to drive the three stable flip-flop input circuits, output voltages having a wave shape and phase relation the same as the voltages of Fig. 2 will be derived, with a repetition rate depending upon the order of the stage or decade.

If a plurality of counting stages are cascaded, tri-stable flip-flops will be inserted between each stage in order to provide suitable operating voltages for the guide sets of the next higher order decade. It will be apparent that no tri-stable flip-flop will be needed on the last or highest order decade or stage. It will be apparent that a reset circuit similar to that shown in the aforementioned Hayes and West application may be provided for use in conjunction with the present invention to initially set the counter to a desired number. Such a reset circuit may consist of a multi-position switch which extinguishes the glow discharges, then re-establishes the GT–1 tube glow current of each stage to K–0, re-establishes the GT–2 tube glow to the K–9 cathode and then transfers the glow in each GT–2 tube to guide set one immediately clockwise from the K–9 cathode. The GT–1 tubes will then be two-thirds of a counting cycle ahead of the GT–2 tubes. It will be apparent to those skilled in the art that by such a method the counting tubes may be set two-thirds of a cycle apart at any desired number. It will also be apparent that the other counting circuits may be employed in conjunction with the invention for particular counting applications. For example, counting circuits utilizing "hard" vacuum tubes may be deemed to be more suitable in the first, or fast lower order decades, and the slower higher order decades may comprise mechanical counting devices. It will also be apparent that shaping or amplifying tubes may be inserted, if desired, between counting decades or stages to amplify the glow tube outputs before they are applied to the succeeding flip-flops.

If the count is progressing additively as time progresses, the flip-flops will always be triggered by pulses from cathodes of GT–1, because GT–1 will always be ⅔ of a counting cycle ahead of GT–2. If the count is subtracting, the flip-flops will always be triggered by pulses from GT–2. It will now become apparent that the electrical backlash at a count from 9 to 0 or from 0 to 9 has been eliminated, since an electrical signal will be present at all times to indicate to a succeeding stage or decade the direction of the count. For example, if the counter is adding from 9 to 0 the two formerly ambiguous third cycles between 9 and 10 when neither cathode of GT–1 is conducting will be accompanied by a state of GT–2 which indicates that the count is adding rather than subtracting. It will be apparent that the invention may be connected to actuate numerous devices upon occurrence of any predetermined count as well as providing visual indications. The neon tube indicating lamps shown in the aforementioned Hayes and West application may be added to counters connected according to the present invention for providing an additional external visual indication. Relays connected to each decade to be actuated by rises in voltages of particular selected cathodes may have their actuated contacts connected in series, so that closure of all of the relays simultaneously (upon occurrence of a predetermined or desired count) actuates any desired electrical device. Numerous actuating circuits will be apparent to those skilled in the art.

While there have been shown in the drawings circuits labeled with specific values of resistance, capacitance, supply voltages and specific tube types, it is to be understood that such values and types are exemplary only, and that numerous possible changes will be readily apparent to those skilled in the art upon perusal of the disclosure without departing from the invention. It is intended that all matter contained in the above description or shown in the accompanying drawing shall be interpreted as illustrative and not in a limiting sense. It is also to be understood that the following claims are intended to cover all of the generic and specific features of the invention herein described, and all statements of the scope of the invention which, as a matter of language might be said to fall therebetween.

Having described the invention what I claim as new and desire to secure by Letters Patent is:

1. A reversible direct coupled counting circuit comprising in combination a pair of multi-electrode gaseous discharge counting devices each having a plurality of numbered elements each operable to produce an output pulse upon receipt of a current translated successively to each of said numbered elements, and each device having a pair of translating means responsive to a pair of applied voltages phased in accordance with counting direction for translating said current, a tri-stable flip-flop connected to receive pulses from three groups of said elements to change state three times during a higher order counting cycle, and circuit means connected to said tri-stable flip-flop to apply voltages to operate similar pairs of translating means of a similar succeeding higher order counting circuit.

2. A reversible counting circuit having a pair of multi-electrode counting devices, each of said counting devices having an anode element and a plurality of numbered elements arranged in circular array about said anode element within a gas-filled envelope, voltage means connected to said anode element and said numbered elements to cause a gaseous discharge current between said anode and one of said numbered elements, pairs of translating elements individual to each device each responsive to a pair of applied voltages phased in accordance with direction for translating said gaseous discharge current to successive numbered elements, the correspondingly numbered elements of each device being connected to common terminals, and a tri-stable flip-flop having three input circuits, each of said input circuits being connected to one of said common terminals to change the state of said flip-flop three times during each higher order counting cycle.

3. A reversible direct-coupled counting circuit having a pair of multi-electrode counting devices, each of more than two said counting devices having a plurality of numbered elements operable to produce a voltage signal upon receipt of a translatable current, pairs of translatable elements individual to each device each responsive to applied voltages phased in accordance with direction for translating said current successively to said numbered elements, and a tri-stable flip-flop connected to receive successively said voltage signals from selected groups of said numbered elements, and said flip-flop being connected to three groups of corresponding pairs of numbered elements so as to change state three times during each counting cycle of a similar higher order counting circuit connected to be actuated by output voltages of said flip-flop.

4. A reversible counting circuit having a pair of multi-electrode counting devices, each of said counting devices having an anode element and a plurality of differently numbered elements arranged successively in circular array about said anode element, voltage means connected to said anode element and said numbered elements to cause a current flow between said anode and one of said numbered elements, translating elements individual to each device each responsive to applied voltages phased in accordance with direction for translating said current flow to successive numbered elements in the two devices, correspondingly numbered elements of each device being connected to common terminals, the applied voltages to the translating elements of one counting device being de-phased a fraction of a counting cycle with respect to the applied voltages to the translating elements of the other counting device, and a tri-stable flip-flop device having three input terminals, each of said input terminals being connected to two of said common terminals to change the state of said flip-flop three times during each counting cycle of the next higher order.

5. A reversible counting circuit having a pair of counting devices, each of said counting devices having a plurality of numbered elements operable to produce a signal upon receipt of a current translatable to successive of said numbered elements, and a pair of translating means responsive to a pair of applied voltages phased in accordance with direction for translating said current, and a tri-stable flip-flop device connected to receive successive pulses from selected groups of said elements to change state three times during each higher order counting cycle.

6. A reversible counting circuit having a pair of counting devices, each of said counting devices having a plurality of numbered elements operable to produce a signal voltage upon receipt of a current translatable successively to each of said numbered elements and a pair of translating means responsive to applied voltages phased in accordance with direction for translating said current, the applied voltages to said translating means being dephased a fraction of a counting cycle, and a tri-stable flip-flop connected to receive successive pulses from selected groups of said numbered elements to change state three times during each higher order counting cycle.

7. Reversible counting apparatus comprising a plurality of counting circuits of ascending order, each of said circuits having a pair of counting devices, each of said counting devices having a plurality of numbered elements operable to produce a signal voltage upon receipt of current in each of said devices translatable successively to said numbered elements of said devices and a pair of translating means responsive to applied voltages phased in accordance with direction for translating the current in each of said devices, and a tri-stable flip-flop connected to receive said signal voltages from selected groups of said numbered elements to change state thrice during each counting cycle of the succeeding higher order counting circuit.

8. A reversible counting circuit having a pair of counting devices, each of said counting devices having a plurality of numbered elements operable to produce a signal upon receipt of a current translatable to successive of said numbered elements and a pair of translating means responsive to a pair of applied voltages phased in accordance with direction for translating said current in each of said devices, and means for applying to said translating means of said pair of counting devices three voltages displaced in phase substantially 120 degrees.

9. A reversible counting circuit having a pair of multi-electrode counting devices, each of said counting devices having an anode element and ten numbered cathode elements arranged successively in circular array about said anode element, voltage means connected to said anode element and to said cathode elements to cause a current flow between said anode element and one of said cathode elements, guide means interposed between successive cathode elements and responsive to applied voltages phased in accordance with direction for transferring said current flow to successive cathode elements via said guide means, the voltages to the guide means of each counting device being two-thirds of a counting cycle out of phase, the correspondingly numbered cathodes of each device being connected to common terminals, and a tri-stable flip-flop device having three input circuits, each flip-flop input circuit being connected to a pair of said common terminals, said common terminals being divided into three groups, each group comprising a plurality of terminals connected to adjacent cathodes, each pair of common terminals comprising the first and last common terminals of each of said groups.

10. A reversible counting circuit having a pair of counting devices, each of said devices having a plurality of numbered elements operable to produce a signal upon receipt of a current translatable successively to said numbered elements and a pair of translating means for each counting device responsive to a pair of applied voltages phased in accordance with counting direction for translating said current in each of said devices, and a tri-stable flip-flop device connected to receive successive pulses at the end and beginning of different states of said tri-stable flip-flop to produce three voltages phased in accordance with counting direction to be applied to the translating means of a similar succeeding higher order counting circuit.

11. A reversible counting circuit having a pair of counting devices, each of said devices having a plurality of numbered elements operable to produce an output signal pulse upon receipt of a current translatable successively to each of said numbered elements and a pair of translating means for each of said devices responsive to a pair of applied voltages phased in accordance with counting direction for translating said current in each of said devices to successive of said numbered elements of said devices, and a tri-stable flip-flop having three input circuits, the first of said input circuits being connected to receive pulses at the end and beginning of a first fraction of a higher order counting cycle, the second of said input circuits being connected to receive pulses at the end and beginning of a second fraction of a higher order counting cycle, and the third of said input circuits being connected to receive pulses at the end and beginning of a third fraction of said higher order counting cycle, thereby producing at the output terminals of said tri-stable flip-flop voltages suitable for actuating the translating means of a succeeding higher order counting stage.

12. A reversible counting circuit having a pair of counting devices, each of said devices having a plurality of numbered elements operable to produce an output signal pulse upon receipt of a translatable current flow and a pair of translating means for each device responsive to a pair of applied voltages phased in accordance with counting direction for translating said current flow successively to said numbered elements, the correspondingly numbered elements of each device being interconnected, said pairs of applied voltages being de-phased a fraction of a counting cycle and the pair of voltages applied to the translating means of one of said devices being de-phased a fraction of a counting cycle from the pair of voltages applied to the translating means of the other of said devices, and a tri-stable flip-flop having three input circuits, the first of said input circuits being connected to receive pulses during an initial portion of a higher order counting cycle, the second of said input circuits being connected to receive pulses during a second portion of a higher order counting cycle, and the third input circuit being connected to receive pulses during a third portion of a higher order counting cycle.

13. A reversible counting circuit having a pair of counting devices, each of said counting devices having a number of numbered elements equal to a base counting number, each of said numbered elements being operable to produce an electrical signal upon receipt of a current translatable successively to said numbered elements and a pair of translating means responsive to a pair of applied voltages having a phase sequence in accordance with counting direction for translating said devices in $n$ steps from one numbered element to a next of said numbered elements, circuit means connecting $n$ groups of said numbered elements to input circuits of a flip-flop device having $n$ stable states, each of said numbered elements of one of said groups being adjacent a numbered element of another of said groups.

14. A reversible counting circuit having a pair of multi-electrode gaseous discharge tubes, each of said tubes having a ten numbered elements, each of said numbered elements being operable to produce an electrical signal upon receipt of a current translatable to successive numbered elements in each of said tubes and a pair of translating means individual to each tube responsive to a pair of applied voltages having a phase sequence in accordance with counting direction for translating said current in each tube to successive numbered elements, the translating means of one of said devices being de-phased two-thirds of a counting cycle from the translating means of the other of said devices, the correspondingly-numbered elements of each device being interconnected, and circuit means connecting three groups of said numbered elements to three actuating circuits of a three-way switching device.

References Cited in the file of this patent

UNITED STATES PATENTS

| | | |
|---|---|---|
| 2,473,159 | Lyman | June 14, 1949 |
| 2,597,360 | Moon | May 29, 1952 |
| 2,604,004 | Root | July 22, 1952 |
| 2,638,541 | Wallmark | May 12, 1953 |

OTHER REFERENCES

"A Cold Cathode Batching Counter," by Tooke, Electronic Engineering, pages 160 to 162, April 1954.